(12) United States Patent
Zhao et al.

(10) Patent No.: US 10,996,668 B2
(45) Date of Patent: *May 4, 2021

(54) SYSTEMS AND METHODS FOR ON-SITE RECOVERY OF AUTONOMOUS VEHICLES

(71) Applicant: UATC, LLC, San Francisco, CA (US)

(72) Inventors: Dennis Zhao, Pittsburgh, PA (US); Eric James Hanson, San Francisco, CA (US); Molly Castle Nix, San Francisco, CA (US); Sean Chin, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,297

(22) Filed: Feb. 10, 2020

(65) Prior Publication Data

US 2020/0233412 A1  Jul. 23, 2020

Related U.S. Application Data

(63) Continuation of application No. 15/884,852, filed on Jan. 31, 2018, now Pat. No. 10,579,054.

(60) Provisional application No. 62/623,155, filed on Jan. 29, 2018.

(51) Int. Cl.
| | |
|---|---|
| *G05D 1/00* | (2006.01) |
| *G06Q 10/00* | (2012.01) |
| *G06Q 50/30* | (2012.01) |
| *H04W 4/44* | (2018.01) |
| *G08G 1/127* | (2006.01) |
| *H04W 4/02* | (2018.01) |

(52) U.S. Cl.
CPC .......... *G05D 1/0027* (2013.01); *G06Q 10/00* (2013.01); *G06Q 50/30* (2013.01); *G08G 1/127* (2013.01); *H04W 4/02* (2013.01); *H04W 4/44* (2018.02)

(58) Field of Classification Search
None
See application file for complete search history.

(56) References Cited

U.S. PATENT DOCUMENTS

| 3,682,360 | A | 8/1972 | Fletcher |
|---|---|---|---|
| 6,583,734 | B2 | 6/2003 | Bates |
| 8,009,027 | B2 | 8/2011 | Thomas |

(Continued)

FOREIGN PATENT DOCUMENTS

DE  102015002913  9/2016

OTHER PUBLICATIONS

International Search Report and Written Opinion for Application No. PCT/2019/015336, dated May 21, 2019, 13 pages.

*Primary Examiner* — Chico A Foxx
(74) *Attorney, Agent, or Firm* — Dority & Manning, P.A.

(57) ABSTRACT

Systems and methods for recovering an autonomous vehicle in a fleet of vehicles are provided. In one example embodiment, a computer-implemented method includes detecting an existence of an adverse condition associated with an autonomous vehicle in the fleet. The method includes determining in response to detecting the adverse condition, a recovery plan for the first autonomous vehicle based at least in part on one or more attributes associated with the adverse condition, the recovery plan including one or more actions to recover the first autonomous vehicle at a remote location. The method includes initiating the recovery plan to recover the first autonomous vehicle at the remote location.

20 Claims, 10 Drawing Sheets

(56) References Cited

U.S. PATENT DOCUMENTS

| | | | |
|---|---|---|---|
| 8,781,442 B1 | 7/2014 | Link | |
| 9,031,732 B1 | 5/2015 | Cudak | |
| 9,964,948 B2* | 5/2018 | Ullrich | B60W 30/18 |
| 10,319,157 B2* | 6/2019 | Minster | G06Q 50/30 |
| 10,395,441 B2* | 8/2019 | Poeppel | B60T 7/22 |
| 10,459,444 B1* | 10/2019 | Kentley-Klay | G05D 1/0027 |
| 10,670,411 B2* | 6/2020 | Starns | G07C 5/0808 |
| 10,691,138 B2* | 6/2020 | Antunes Marques Esteves | B60L 58/12 |
| 10,749,960 B2* | 8/2020 | Way | G05D 1/0022 |
| 2002/0016655 A1 | 2/2002 | Joao | |
| 2002/0035422 A1 | 3/2002 | Sasaki | |
| 2003/0058087 A1 | 3/2003 | Wenzel | |
| 2005/0285756 A1 | 12/2005 | Shwak | |
| 2008/0119965 A1 | 5/2008 | McCrary | |
| 2009/0177350 A1 | 7/2009 | Williams | |
| 2010/0268423 A1 | 10/2010 | Breed | |
| 2011/0130916 A1* | 6/2011 | Mayer | G08G 1/127 701/31.4 |
| 2011/0241862 A1 | 10/2011 | Debouk | |
| 2012/0029763 A1 | 2/2012 | Hering | |
| 2014/0277910 A1 | 9/2014 | Suh | |
| 2014/0306826 A1 | 10/2014 | Ricci | |
| 2015/0092056 A1 | 4/2015 | Rau | |
| 2015/0239456 A1 | 8/2015 | Liggins | |
| 2015/0348335 A1* | 12/2015 | Ramanujam | G05D 1/0088 701/23 |
| 2017/0083957 A1* | 3/2017 | Ross | G06Q 30/0283 |
| 2017/0297569 A1 | 10/2017 | Nilsson | |
| 2018/0047107 A1 | 2/2018 | Perl | |
| 2018/0052463 A1* | 2/2018 | Mays | B60W 50/02 |
| 2018/0075380 A1 | 3/2018 | Perl | |
| 2018/0225769 A1 | 8/2018 | Slusar | |
| 2018/0322775 A1* | 11/2018 | Chase | G07C 5/008 |
| 2018/0376305 A1* | 12/2018 | Ramalho de Oliveira | G08G 1/096775 |
| 2019/0025817 A1* | 1/2019 | Mattingly | H04L 9/0825 |
| 2019/0025818 A1* | 1/2019 | Mattingly | G05D 1/0027 |
| 2019/0197795 A1* | 6/2019 | Mondello | G07C 5/008 |
| 2019/0212725 A1* | 7/2019 | Woodrow | G08G 1/22 |
| 2019/0318277 A1* | 10/2019 | Goldman | G06Q 50/30 |
| 2020/0051001 A1* | 2/2020 | Donnelly | G06Q 10/02 |
| 2020/0074575 A1* | 3/2020 | Efird | G06Q 50/30 |
| 2020/0201355 A1* | 6/2020 | Colijn | G08G 1/143 |
| 2020/0272949 A1* | 8/2020 | Chen | G06Q 10/02 |

* cited by examiner

SYSTEMS AND METHODS FOR ON-SITE RECOVERY OF AUTONOMOUS VEHICLES

PRIORITY CLAIM

The Present application is a continuation of U.S. application Ser. No. 15/884,852 having a filing date of Jan. 31, 2018, entitled "Systems and Methods for On-Site Recovery of Autonomous Vehicles," which claims benefit of priority of U.S. Provisional Patent Application No. 62/623,155 filed Jan. 29, 2018, entitled "Systems and Methods for On-Site Recovery of Autonomous Vehicles." The above-referenced patent applications are incorporated herein by reference.

FIELD

The present disclosure relates to systems and methods that provide for recovering an autonomous vehicle.

BACKGROUND

An autonomous vehicle can be capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for recovering an autonomous vehicle in a fleet of vehicles. The method includes detecting, by a computing system that includes one or more computing devices, an existence of an adverse condition associated with a first autonomous vehicle in the fleet. The method includes determining, by the computing system, in response to detecting the adverse condition, a recovery plan for the first autonomous vehicle based at least in part on one or more attributes associated with the adverse condition, the recovery plan including one or more actions to recover the first autonomous vehicle at a remote location. The method includes initiating, by the computing system, the recovery plan to recover the first autonomous vehicle at the remote location.

Another example aspect of the present disclosure is directed to a computing system for recovering an autonomous vehicle. The computing system includes one or more processors and one or more tangible, non-transitory, computer readable media that collectively store instructions that when executed by the one or more processors cause the computing system to perform operations. The operations include detecting an existence of an adverse condition associated with a first autonomous vehicle in a fleet of vehicles. The operations include determining, in response to detecting the adverse condition, a recovery plan for the first autonomous vehicle based at least in part on one or more attributes associated with the adverse condition, the recovery plan including one or more actions to recover the first autonomous vehicle at a remote location. The operations include initiating the recovery plan to recover the first autonomous vehicle at the remote location.

Yet another example aspect of the present disclosure is directed to an autonomous vehicle. The autonomous vehicle includes one or more processors and one or more tangible, non-transitory, computer readable media that collectively store instructions that when executed by the one or more processors cause the autonomous vehicle to perform operations. The operations include monitoring one or more parameters associated with the autonomous vehicle. The operations include detecting an adverse condition associated with the autonomous vehicle based at least in part on the one or more parameters. The operations include stopping a motion of the autonomous vehicle in response to detecting the adverse condition. The operations include sending one or more communications to a remote computing system, the one or more communications including a request for assistance with the adverse condition. The operations include receiving, from the remote computing system, data indicative of a recovery plan that includes a recovery team being sent to recover the autonomous vehicle at a location where the autonomous vehicle is stopped. The operations include displaying data indicative of the adverse condition and the recovery plan via one or more display devices onboard the autonomous vehicle.

Other example aspects of the present disclosure are directed to systems, methods, vehicles, apparatuses, tangible, non-transitory computer-readable media, and memory devices for providing for recovery of autonomous vehicles.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which.

Figure 1:
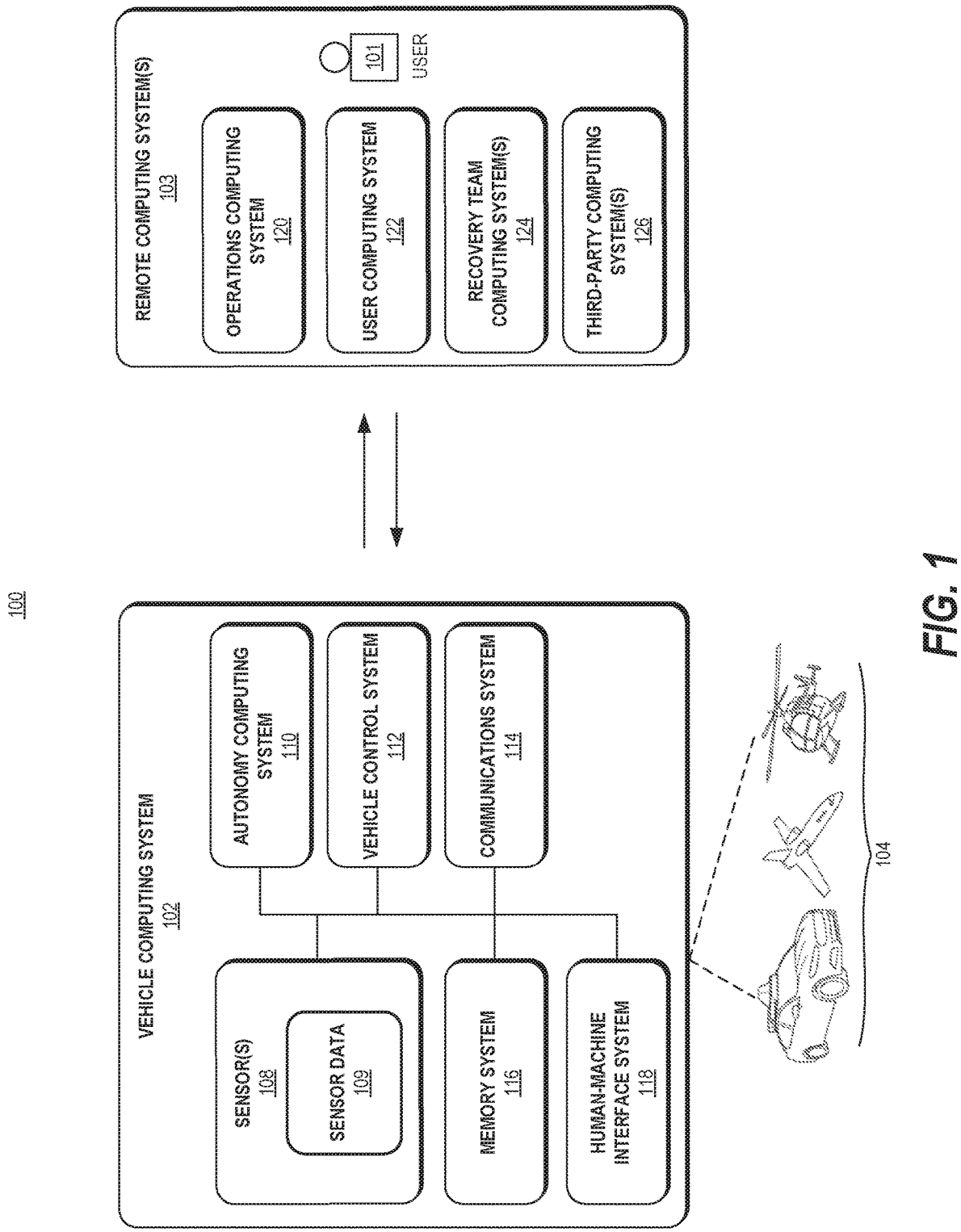
FIG. 1 depicts a block diagram of an example system overview according to example embodiments of the present disclosure.

Reference numerals that are repeated across plural figures are intended to identify the same components or features in various implementations.

DETAILED DESCRIPTION

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to recovering an autonomous vehicle in response to an adverse condition associated with the autonomous vehicle. For instance, a service provider can use a fleet of vehicles to provide one or more vehicle services to a plurality of users. The fleet can include, for example, autonomous vehicles that can drive, navigate, operate, etc. with minimal and/or no interaction from a human driver.

The service provider can coordinate the autonomous vehicles to provide the vehicle services of the service provider (e.g., transportation service, courier service, delivery service). For example, the service provider can receive a service request (e.g., for transportation) for a user and select an autonomous vehicle to provide the vehicle service to the user.

The service provider can detect an existence of one or more adverse conditions that render the autonomous vehicles unable or unsuitable to provide the vehicle services (e.g., before, during, or after the vehicle transports a user). For example, an autonomous vehicle can experience a component failure that affects the vehicle's ability to drive or navigate in an effective manner, encounter an unfamiliar environment that the autonomous vehicle cannot navigate, etc. As another example, a user may experience a medical emergency, etc. As a result of the existence of an adverse condition, a vehicle computing system of the autonomous vehicle can stop a motion of the vehicle, and preclude the vehicle from completing a vehicle service.

In response to detecting the existence of an adverse condition associated with an autonomous vehicle, the service provider can implement a recovery plan to recover the autonomous vehicle at a location where the vehicle is stopped. The recovery plan can include, for example, sending a human operator (e.g., technician, mechanic, etc.) to diagnose and/or fix a component failure in an autonomous vehicle, sending a human operator (e.g., driver) to manually operate and navigate an autonomous vehicle through an unfamiliar environment, sending a medical personnel (e.g., paramedic) to assist a user, sending another vehicle (e.g., another autonomous vehicle) to complete a vehicle service associated with an autonomous vehicle, etc. In this way, the service provider can manage and execute the recovery and on-site assistance to autonomous vehicles (and/or associated users) that experience adverse conditions.

More particularly, an entity (e.g., service provider, owner, manager) can use one or more vehicles (e.g., ground-based vehicles, aircrafts, etc.) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the autonomous vehicle (e.g., located on or within the autonomous vehicle). The vehicle computing system can receive external sensor data from sensor(s) onboard the vehicle (e.g., cameras, LIDAR, RADAR), attempt to comprehend the vehicle's surrounding environment by performing various processing techniques on the sensor data, and generate an appropriate motion plan through the vehicle's surrounding environment. Additionally, the vehicle computing system can receive internal sensor data from sensor(s) onboard the vehicle (e.g., fuel sensors, charge sensors, engine sensors, tire sensors, visible spectrum cameras, infrared cameras, motion sensors, door sensors, pressure sensors, and/or other types of image capture devices and/or sensors). The vehicle computing system can attempt to comprehend the vehicle's interior environment by performing various processing techniques on the internal sensor data. Moreover, the autonomous vehicle can be configured to communicate with one or more computing devices that are remote from the vehicle. For example, the autonomous vehicle can communicate with an operations computing system that can be associated with the entity. The operations computing system can help the entity monitor, communicate with, manage, etc. the fleet of vehicles. As another example, the autonomous vehicle can communicate with a user computing system (e.g., mobile phone, mobile computer, desktop computer, etc.) that can be associated with a user. In some implementations, the operations computing system can mediate communication between the autonomous vehicle and the user computing system.

In some implementations, a vehicle computing system can monitor one or more parameters associated with an autonomous vehicle. The one or more parameters can include, for example, fuel level, charge level, engine conditions, tire pressure, conditions associated with the vehicle's interior, conditions associated with the vehicle's exterior (e.g., damage), conditions associated with one or more systems onboard the vehicle (e.g., autonomy system, vehicle control system, communications system, memory system, human-machine interface system, etc.), and/or other health and maintenance data of the autonomous vehicle. In some implementations, the parameters can be indicative of user input and/or can be related to a user of the vehicle. For example, the vehicle computing system can obtain (e.g., via a human-machine interface) data indicative of user input that reports an adverse condition (e.g., smoke in the interior, user panic attack, etc.).

In some implementations, a vehicle computing system can be configured to determine an operational state of an autonomous vehicle, based, at least in part on one or more parameters associated with an autonomous vehicle. The operational state can be indicative of whether the vehicle is in condition to provide a vehicle service to one or more users. For example, the operational state can indicate that the vehicle is in condition to continue to provide a vehicle service to one or more current users. Thus, the vehicle computing system can control the vehicle to finish providing the vehicle services (e.g., transporting current riders to their destination location) before travelling to a maintenance location. In some instances, the operational state can indicate that the vehicle is not in condition to provide the vehicle services because the one or more parameters indicate an existence of an adverse condition associated with the vehicle. Thus, the vehicle computing system can proceed to stop a motion of the vehicle and preclude the vehicle from providing and/or continuing the vehicle services. The vehicle computing system can communicate with a remote operations computing system of the entity to report the operational state of the vehicle and/or the existence of the adverse condition. The communication can also indicate, for example, that the vehicle is unavailable to provide vehicle services, a location where the vehicle is stopped, and/or other information associated with the adverse condition.

As an example, the one or more parameters can indicate that the vehicle's fuel level is below a threshold value. The vehicle computing system can determine whether the fuel level is sufficient to transport one or more current users to their corresponding destinations. If the vehicle computing system determines that the fuel level is sufficient, then the vehicle computing system can determine that the vehicle is in condition to continue to provide a vehicle service to the one or more current users. Alternatively, if the vehicle computing system determines that the fuel level is insufficient to transport the one or more users to their corresponding destinations, then the vehicle computing system can determine that the vehicle is not in condition to provide the vehicle services. The vehicle computing system can control the vehicle to travel to a safe location, and stop a motion of the vehicle at the safe location. The vehicle computing system can send data indicative of the operational state and/or the adverse condition (e.g., insufficient fuel) to the entity.

As another example, the one or more parameters can indicate that the vehicle computing system is unable to generate a motion plan for the vehicle. The vehicle computing system can determine that the vehicle is not in condition to provide a vehicle service to the one or more current users. The vehicle computing system can stop a motion of the vehicle at its current location. The vehicle computing system can send data indicative of the operational state and/or the adverse condition (e.g., navigation error) to the entity.

In some implementations, a user can identify an adverse condition associated with an autonomous vehicle. The user may identify the condition before and/or after entering the vehicle or receiving a vehicle service from the vehicle (e.g., while riding in the vehicle). In some implementations, the condition can be severe, rendering the autonomous vehicle unsuitable to provide the vehicle service to the user. For example, the condition can be detrimental to a health or well-being of the user, a user experience, etc. The user can provide user input to a user device (e.g., a mobile phone of the user, a tablet of the vehicle, etc.) indicating the existence of the condition. The user device can communicate with a remote operations computing system of the entity to report the adverse condition. The communication can also indicate, for example, a location of the vehicle, and/or other information associated with the adverse condition.

In some implementations, an operations computing system can detect an existence of an adverse condition associated with an autonomous vehicle based, at least in part, on one or more received communications. As an example, the operations computing system can receive a communication from an autonomous vehicle (e.g., via a vehicle computing system) or a user (e.g., via a user device) indicative of the existence of the condition. As another example, the operations computing system can receive a communication indicating a status of the vehicle. If the status is inconsistent with one or more control signals previously sent to the vehicle, then the operations computing system can determine an existence of an adverse condition associated with the vehicle (e.g., a component failure in a vehicle control system of the vehicle).

In some implementations, an operations computing system can detect an existence of an adverse condition associated with an autonomous vehicle based, at least in part, on an absence of one or more communications. As an example, the operations computing system can expect periodic communications from the autonomous vehicle to update the operations computing system of the vehicle's status. If the operations computing system does not receive such communications, then the operations computing system can determine an existence of an adverse condition associated with the vehicle (e.g., a component failure in a communications system of the vehicle). As another example, the operations computing system can attempt to communicate with the autonomous vehicle (e.g., to select the vehicle to provide a vehicle service, send control signals, etc.) and expect the vehicle to communicate an acknowledgement. If the operations computing system does not receive such communications, then the operations computing system can determine an existence of an adverse condition associated with the vehicle.

An operations computing system can determine a recovery plan to recover an autonomous vehicle, in response to detecting an existence of an adverse condition associated with the vehicle. The recovery plan can include one or more actions (e.g., recovery actions) that attempt to alleviate the adverse condition. For example, the recovery actions can include stopping the motion of the vehicle, precluding the vehicle from providing/completing a vehicle service, remote diagnosis of the adverse condition, on-site diagnosis of the adverse condition, providing assistance to a user associated with the vehicle, completing a vehicle service for a user associated with the vehicle, etc.

In some implementations, a recovery plan can include one or more actions to be taken by an autonomous vehicle associated with an adverse condition. An operations computing system can send one or more control signals to cause the autonomous vehicle to perform the action(s). For example, the operations computing system can send control signals to the vehicle to stop a motion of the vehicle, reject any additional service requests, perform diagnostics maneuvers, provide information to a user, etc.

In some implementations, a recovery plan can include one or more actions to remotely diagnose and alleviate an adverse condition associated with an autonomous vehicle (e.g., perform remote recovery of the vehicle). As an example, if the adverse condition is associated with a component failure in a backup/redundant system onboard the autonomous vehicle, then the operational state of the vehicle can indicate that the vehicle is not in condition to provide a vehicle service, but the vehicle can be otherwise operational. In this case, the operations computing system can send control signals that instruct the vehicle to reject any additional service requests and travel to a service/maintenance depot.

As another example, if the adverse condition is associated with a navigation error, then the operational state of the vehicle can indicate that the vehicle can be unable to provide a vehicle service in its surrounding environment. The operations computing system can send control signals that instruct the vehicle to execute one or more vehicle maneuvers (e.g., diagnostics maneuvers). In this way, the operations computing system (and/or a human operator associated therewith) can attempt to remotely operate the vehicle through the surrounding environment.

As another example, if the adverse condition is associated with a user panic attack, and the vehicle computing system obtains data indicative of user input that reports the adverse condition, then the operational state of the vehicle can indicate that the vehicle is not in condition to continue providing a vehicle service for the user. The operations computing system can connect the user with a human operator who can address the user's concerns (e.g., via a communications system of the vehicle).

As another example, if a user reports an adverse condition to a remote operations computing system of the entity, then the entity can determine an existence of the adverse condition but the operational state of the vehicle can indicate that the vehicle is in condition to continue to provide a vehicle service to one or more current users. The operations computing system can send control signals to stop a motion of the vehicle, and connect the user with a human operator who can address the user's concerns (e.g., via a user device).

In some implementations, a recovery plan can include one or more actions to perform on-site recovery of an autonomous vehicle associated with an adverse condition. For instance, if the operations computing system is unable to successfully perform remote recovery of the vehicle, then the operations computing system can coordinate on-site recovery of the vehicle. As an example, the operations computing system can coordinate the provision of a human operator to a location where the vehicle is stopped. The human operator can perform a hands-on diagnosis of the adverse condition, manually operate the autonomous vehicle, tow the autonomous vehicle to another location, provide assistance to a user, etc.

In some implementations, an operations computing system can determine a recovery plan to recover an autonomous vehicle associated with an adverse condition based, at least in part, on one or more attributes associated with the adverse condition. The one or more attributes can include, for example, information on what caused the adverse condition, a description of the adverse condition, a location of the autonomous vehicle when the adverse condition is detected, a location where the autonomous vehicle is stopped, a vehicle service being provided by the vehicle, one or more users associated with a vehicle service being provided by the vehicle, an environment proximate to the vehicle, and/or other information that can assist the operations computing system to determine the recovery plan. As one example, if the adverse condition is detected when the autonomous vehicle is providing a vehicle service for a user, then the recovery plan can include sending one or more communications to notify the user about the adverse condition and/or the recovery plan. As another example, if the adverse condition is detected when the autonomous vehicle is providing a vehicle service for a user, then the recovery plan can include sending another autonomous vehicle to the user's location to pick-up the user and complete the vehicle service. As another example, if the adverse condition is associated with a medical emergency of a user in the autonomous vehicle, then the recovery plan can include sending medical personnel to a location of the vehicle. As another example, if an adverse condition is associated with an autonomous operation of the autonomous vehicle, then the recovery plan can include sending a driver to manually operate the vehicle. As another example, the operations computing system can send control signals to another autonomous vehicle to transport a human operator to a location of the adversely affected autonomous vehicle. The human operator can exit the other autonomous vehicle at the location of the adversely affect autonomous vehicle and enter the adversely affect autonomous vehicle to manually operate it. After dropping off the human operator, the other autonomous vehicle can transport one or more users, if any, and/or be available for providing services to other users. As another example, if the adverse condition is associated with a vehicle control system of the autonomous vehicle, then the recovery plan can include sending a tow-truck to tow the vehicle to a repair depot. As another example, if the adverse condition is associated with the autonomous vehicle stopped in a middle lane of a highway, then the recovery plan can include sending a tow-truck to tow the vehicle to a safer location.

In some implementations, an operations computing system can determine a recovery plan to recover an autonomous vehicle associated with an adverse condition based, at least in part, on an availability of resources for recovering the vehicle. As an example, the operations computing system can manage a plurality of recovery teams that can be sent to recover the autonomous vehicle. The recovery teams can include for example, one or more human operators (e.g., drivers, mechanics, etc.), one or more vehicles (e.g., autonomous vehicles), and/or other personnel or equipment that can assist in recovering a vehicle. The operations computing system can determine one or more strategic locations where the recovery teams can be located. The operations computing system can determine the strategic locations based on, for example, vehicle service demand, a supply of vehicles, an incident history, characteristics of the fleet, weather/road/traffic conditions, etc. In some implementations, the recovery teams can be mobile and can change locations (e.g., in response to an existence of one or more adverse conditions associated with one or more vehicles in the fleet). In some implementations, the operations computing system can update the strategic locations for the plurality of recovery teams based on a change in the condition(s). The recovery plan can include selecting a recovery team to recover the autonomous vehicle, for example, based on an available recovery team that is geographically proximate to the autonomous vehicle, or that can arrive at a location of the autonomous vehicle in the shortest time (e.g., due to traffic, etc.).

As another example, the operations computing system can determine an availability of third-party services in proximity (e.g., proximate in time, proximate in distance, etc.) to the autonomous vehicle associated with an adverse condition. The third-party services can include, for example, an emergency medical technician (EMT) service provided by nearby hospitals, a towing service provided by local businesses, etc. The operations computing system can determine a third-party service provider to provide a third-party service that can assist in recovering the vehicle. The operations computing system can determine the third-party service provider based on, for example, an estimated wait time associated with a corresponding third-party service.

The systems and methods described herein may provide a number of technical effects and benefits. For instance, by detecting an adverse condition associated with an autonomous vehicle, and attributes associated with the adverse condition, an entity can formulate an appropriate recovery plan to recover the vehicle. In particular, the entity can attempt a remote recovery of the vehicle before attempting an on-site recovery of the vehicle. If the remote recovery is successful, the entity can expedite recovery of the vehicle and conserve resources that are available for performing an on-site recovery. In this way, the entity can improve efficiency of providing vehicle services to a plurality of users. In addition, by managing a plurality of recovery teams and determining strategic locations for the recovery teams, the entity can further reduce a recovery time for recovering the vehicle, and optimize use of the resources. This can also lead to a decrease in vehicle downtime.

The systems and methods of the present disclosure also provide an improvement to vehicle computing technology, such as autonomous vehicle computing technology. For instance, the systems and methods can allow for receiving a service request for a vehicle service, selecting an autonomous vehicle to provide the vehicle service, detecting adverse conditions associated with the autonomous vehicle, and initiating a recovery plan including one or more actions to alleviate the adverse conditions. In addition, the systems and methods can allow for communicating an existence of the adverse conditions by a user. As such, the systems and methods enable the vehicle technology to leverage the functions of the operations computing system to determine and address adverse conditions of the autonomous vehicle that may not otherwise be detected by the vehicle computing technology. Furthermore, the systems and methods can allow for determining a recovery plan based, at least in part, on the existence of the conditions. Thus, the systems and methods can allow for improved reliability of providing/completing a vehicle service of a user.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104.

In some implementations, the system 100 can include one or more remote computing system(s) 103 that are remote from the vehicle 104. The remote computing system(s) 103 can include an operations computing system 120, user computing system 122, recovery team computing system(s) 124, and third-party computing system(s) 126. The remote computing system(s) 103 can be separate from one another or share computing device(s). In some implementations, the operations computing system 120 can remotely manage the vehicle 104.

The user computing system 122 can be associated with a user 101, and can communicate with the vehicle computing system 102 and/or the operations computing system 120. As an example, the user 101 can request a vehicle service via the user computing system 122 (e.g., a mobile phone device). In some implementations, the user 101 can generate a service request via a software application on the user computing system 122. The user computing system 122 can provide data indicative of the service request to the operations computing system 120 (e.g., which can assign the vehicle 104 to such a request).

As another example, the vehicle computing system 102 (and/or the operations computing system 120) can provide data indicative of an adverse condition and/or a recovery plan associated with the adverse condition to the user computing system 122. The data indicative of the adverse condition can include, for example, information on what caused the adverse condition, a description of the adverse condition, etc. The data indicative of the recovery plan can include, for example, information about another autonomous vehicle being sent to a location of the user 101 (e.g., a location of the vehicle 104, or a location of the user computing system 122) to pick-up and complete a vehicle service for the user 101, an estimated time of arrival for the another autonomous vehicle to reach the location of the user 101, etc.

As another example, the user 101 can provide an input to the user computing system 122 indicating an existence of an adverse condition associated with the vehicle 104 before and/or after entering the vehicle 104 or receiving a vehicle service from the vehicle 104 (e.g., while riding in the vehicle 104). The user computing system 122 can provide data indicative of the adverse condition to the vehicle computing system 102 (and/or the operations computing system 120) in order to report the existence of the adverse condition. The data indicative of the adverse condition can also include, for example, a location of the vehicle 104, a location of the user computing system 122, other information associated with the adverse condition, etc.

The recovery team computing system(s) 124 can be associated with one or more recovery teams, and can communicate with the operations computing system 120. As an example, the recovery team computing system(s) 124 can provide the operations computing system 120 with information indicative of a status of the one or more recovery teams (e.g., an availability of human operators, vehicles, and/or other personnel or equipment that can assist in recovering a vehicle). The operations computing system 120 can initiate a recovery plan by selecting a recovery team to perform on-site recovery of an autonomous vehicle (e.g., vehicle 104) based on the information provided by the recovery team computing system(s) 124. The operations computing system 120 can provide data indicative of the recovery plan to the recovery team computing system(s) 124. The data indicative of the recovery plan can include, for example, a selection of the recovery team to perform on-site recovery of the vehicle 104, information on an adverse condition associated with the vehicle 104 (e.g., what caused the adverse condition, a description of the adverse condition, etc.), a recovery location (e.g., location of the vehicle 104, location of the user computing system 122, etc.), a vehicle service being provided by the vehicle 104, a third-party service being requested to assist with recovering the vehicle 104, etc. The recovery team computing system(s) 124 can notify and/or instruct the selected recovery team to perform the on-site recovery. In some implementations, the operations computing system 120 can communicate a selection of a recovery team to be sent at a later time. In response, the recovery team computing system(s) 124 can schedule the selected recovery team to be sent at the later time.

The third-party computing system(s) 126 can be associated with one or more third-party services, and can communicate with the operations computing system 120. As an example, the third-party computing system(s) 126 can provide the operations computing system 120 with information indicative of available third-party services (e.g., types of services available, estimated wait times, etc.). The operations computing system 120 can initiate a recovery plan by selecting a third-party service provider to assist in on-site recovery of an autonomous vehicle based on the information provided by the third-party computing system(s) 126. The operations computing system 120 can provide data indicative of the recovery plan to the third-party computing system(s) 126. The data indicative of the recovery plan can include, for example, a selection of the third-party service provider to assist in on-site recovery of the vehicle 104, information on an adverse condition associated with the vehicle 104 (e.g., what caused the adverse condition, a description of the adverse condition, etc.), a recovery location (e.g., location of the vehicle 104, location of the user computing system 122, etc.), a third-party service being requested from the selected third-party service provider to assist with recovering the vehicle 104, etc.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 104 can be an autonomous vehicle that can drive, navigate, operate, etc. with minimal and/or no interaction from a human driver.

The vehicle computing system 102 can include one or more computing device(s) located on-board the vehicle 104 (e.g., located on and/or within the vehicle 104). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions, such as those described herein.

As shown in FIG. 1, the vehicle 104 can include one or more sensors 108, an autonomy computing system 110, a vehicle control system 112, a communications system 114, a memory system 116, and a human-machine interface system 118. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 104 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, to the side of the vehicle 104, etc. The sensor data 109 can be indicative of locations associated with the object(s) within the surrounding environment of the vehicle 104 at one or more times. The sensor(s) 108 can provide the sensor data 109 to the autonomy computing system 110.

In some implementations, the sensor(s) 108 can be configured to acquire sensor data 109 indicative of one or more parameters associated with the vehicle 104. As an example, the sensor data 109 can include image data, motion capture data, and/or other data acquired by the sensors 108 indicative of one or more objects that occupy the interior environment of the vehicle 104. The object(s) can include one or more user(s), cargo, items/goods, and/or other object(s) associated with the vehicle service. As another example, the sensor data 109 can include one or more sensor readings acquired by the sensors 108 indicative of when a vehicle service is being provided by the vehicle 104. As another example, the sensor data 109 can include one or more sensor readings acquired by the sensors 108 indicative of a health and operational status of the vehicle 104 (e.g., fuel level, charge level, engine conditions, tire pressure, conditions associated with the vehicle's interior, conditions associated with the vehicle's exterior, conditions associated with one or more systems onboard the vehicle, etc.)

The human machine interface system 118 can be configured to allow interaction between a user (e.g., human), the vehicle 104 (e.g., vehicle computing system 102), and/or remote computing system(s) 103 (e.g., an operator associated with the operations computing system 120). The human machine interface system 118 can include a variety of interfaces for the user to input and/or receive information from the vehicle computing system 102. For example, the human machine interface system 118 can include a graphical user interface, direct manipulation interface, web-based user interface, touch user interface, attentive user interface, conversational and/or voice interfaces (e.g., via text messages, chatter robot), conversational interface agent, interactive voice response (IVR) system, gesture interface, and/or other types of interfaces. The human machine interface system(s) 118 can include one or more input device(s) (e.g., touch-screens, keypad, touchpad, knobs, buttons, sliders, switches, mouse, gyroscope, microphone, other hardware interfaces) configured to receive user input. The human machine interface(s) 118 can also include one or more output device(s) (e.g., display devices, speakers, lights) to receive and output data associated with the interfaces.

Figure 2:
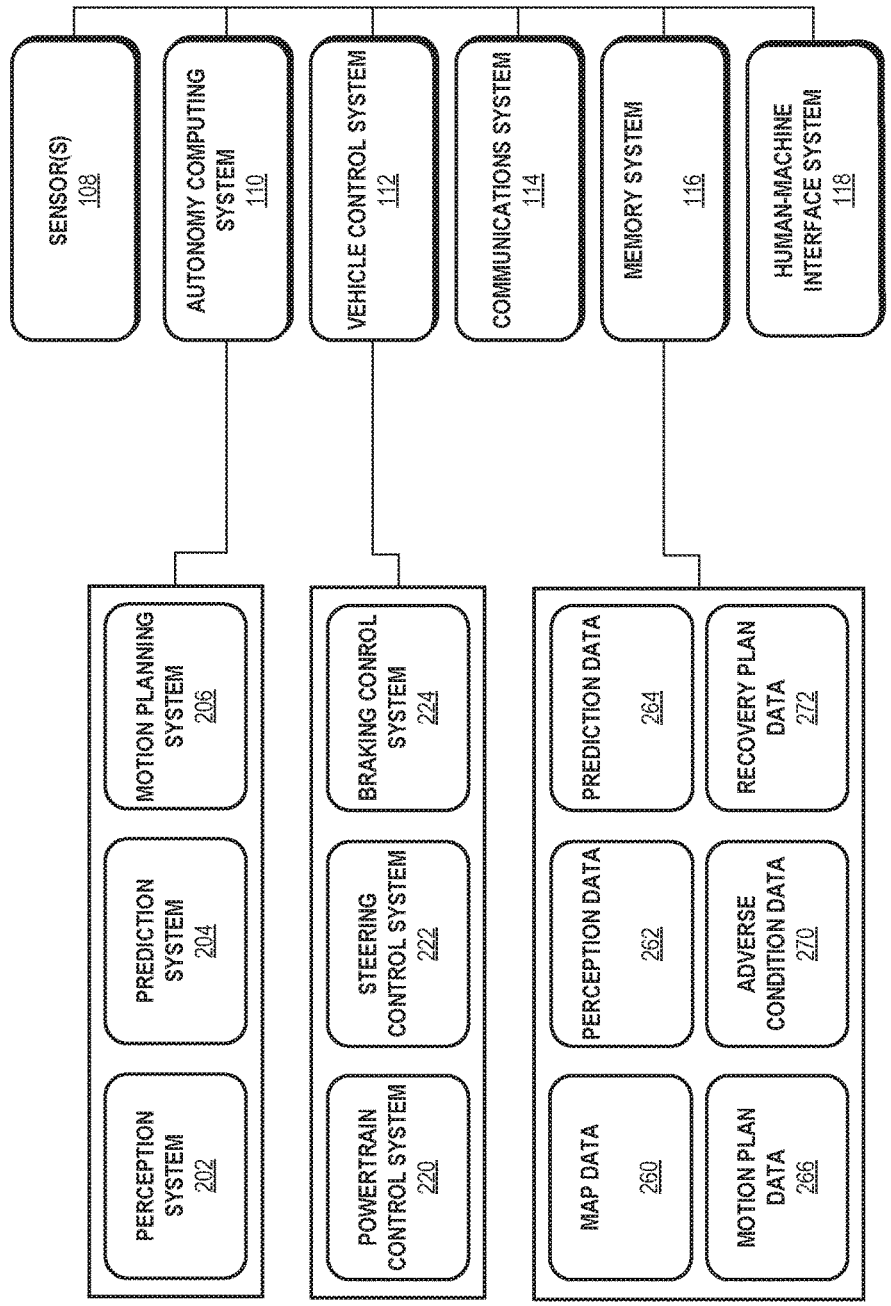
FIG. 2 depicts a block diagram of an example vehicle computing system according to example embodiments of the present disclosure.

As shown in FIG. 2, the autonomy computing system 110 can include a perception system 202, a prediction system 204, a motion planning system 206, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 260. For instance, the perception system 202 can perform various processing techniques on the sensor data 109 to determine perception data 262 that is descriptive of a current state of one or more object(s) that are proximate to the vehicle 104. The prediction system 204 can create prediction data 264 associated with each of the respective one or more object(s) proximate to the vehicle 104. The prediction data 264 can be indicative of one or more predicted future locations of each respective object. The motion planning system 206 can determine a motion plan for the vehicle 104 based at least in part on the prediction data 264 (and/or other data), and save the motion plan as motion plan data 266. The motion plan data 266 can include vehicle actions with respect to the object(s) proximate to the vehicle 104 as well as the predicted movements. The motion plan data 266 can include a planned trajectory, speed, acceleration, etc. of the vehicle 104.

The motion planning system 206 can provide at least a portion of the motion plan data 266 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 266 into instructions. By way of example, the mobility controller can translate the motion plan data 266 into instructions to adjust the steering of the vehicle 104 "X" degrees, apply a certain magnitude of braking force, etc. The mobility controller can send one or more control signals to the responsible vehicle control sub-system (e.g., powertrain control system 220, steering control system 222, braking control system 224) to execute the instructions and implement the motion plan.

The communications system 114 can allow the vehicle computing system 102 (and its computing system(s)) to communicate with other computing systems (e.g., remote computing system(s) 103). The vehicle computing system 102 can use the communications system 114 to communicate with the operations computing system 120 and/or one or more other remote computing system(s) over one or more networks (e.g., via one or more wireless signal connections). In some implementations, the communications system 114 can allow communication among one or more of the system(s) on-board the vehicle 104. The communications system 114 can include any suitable sub-systems for interfacing with one or more network(s), including, for example, transmitters, receivers, ports, controllers, antennas, and/or other suitable sub-systems that can help facilitate communication.

The memory system 116 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 260, perception data 262, prediction data 264, motion plan data 266, adverse condition data 270, and recovery plan data 272.

The map data 260 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The adverse condition data 270 can include data indicative of one or more adverse condition(s) associated with the vehicle 104. For example, the adverse condition data 270 can include data indicative of a component failure in the vehicle 104, navigational error of the vehicle 104, medical emergency of a user associated with the vehicle 104, an operational state of the vehicle 104, one or more attributes of an adverse condition associated with the vehicle 104, etc. The vehicle computing system 102 can obtain the adverse condition data 270 based on monitoring one or more parameters associated with the vehicle 104. Additionally, or alternatively, the vehicle computing system 102 can obtain the adverse condition data 270 from the remote computing system(s) 103 (e.g., operations computing system 120, user computing system 122).

The recovery plan data 272 can include data indicative of one or more recovery plan(s) associated with the vehicle 104. As an example, the recovery plan data 272 can include data indicative of one or more actions to be taken by the vehicle computing system 102. The one or more actions can include, for example, stopping a motion of the vehicle 104, rejecting any additional service requests, performing diagnostics maneuvers, providing information to a user, etc. As another example, the recovery plan data 272 can include data indicative of a recovery team being sent to a location of the vehicle 104 (e.g., human operator, another autonomous vehicle, etc.), medical personnel being sent to assist a user, an estimated wait time, etc. The vehicle computing system 102 can obtain the recovery plan data 272 from the remote computing system(s) 103 (e.g., operations computing system 120).

Figure 3:
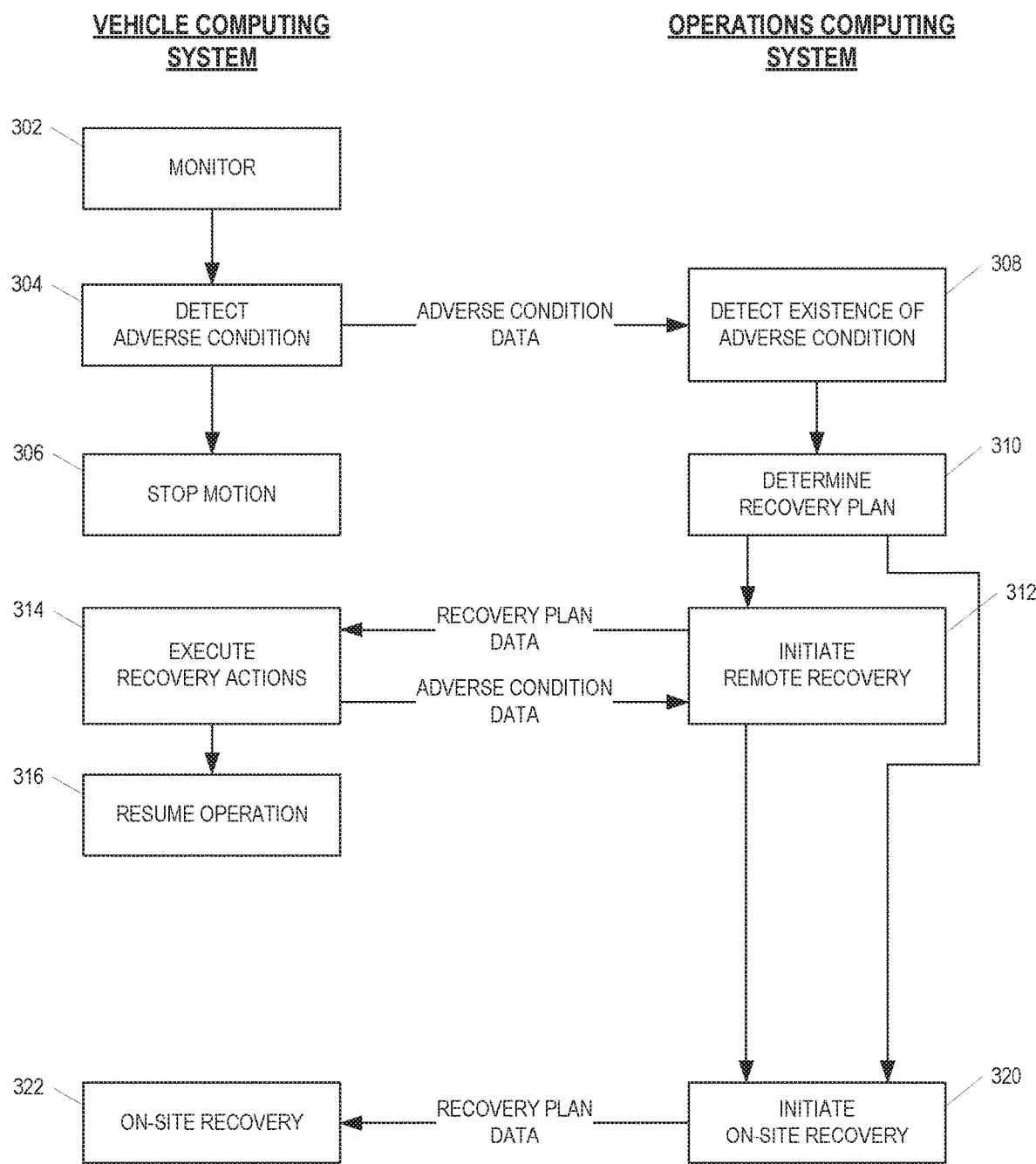
FIG. 3 depicts a flow diagram of recovering an autonomous vehicle according to example embodiments of the present disclosure.

FIG. 3 shows an example process of recovering vehicle 104 according to example embodiments of the present disclosure. One or more portion(s) of this process can be implemented by a computing system that includes one or more computing devices such as, for example, the vehicle computing system 102, the operations computing system 120, etc. Each respective portion can be performed by any (or any combination) of a computing system. Moreover, one or more portion(s) can be implemented as an algorithm on the hardware components of the device(s) described herein (e.g., as in FIGS. 1 and 7), for example, to facilitate recovery of a vehicle. FIG. 3 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (302), the vehicle computing system 102 can monitor one or more parameters associated with the vehicle 104, for example, based on the sensor data 109. The vehicle computing system 102 can simultaneously control the vehicle 104 to provide one or more vehicle services to one or more users while monitoring the one or more parameters associated with the vehicle 104.

At (304), the vehicle computing system 102 can determine an existence of an adverse condition associated with the vehicle 104, based, at least in part on the one or more parameters. The vehicle computing system 102 can determine that the vehicle 104 is not in condition to provide a vehicle service based, at least in part, on the existence of the adverse condition. The vehicle computing system 102 can store information associated with the adverse condition (e.g., the adverse condition data 270), and send the adverse condition data 270 to the operations computing system 120. By way of example, the vehicle computing system 102 can determine an existence of an adverse condition associated with a navigation error of the vehicle 104, or a component failure in the vehicle 104.

At (306), the vehicle computing system 102 can stop a motion of the vehicle 104, if necessary.

At (308), the operations computing system 120 can detect the existence of the adverse condition associated with the vehicle 104 based, at least in part, on the adverse condition data 270 received from the vehicle computing system 102.

At (310), the operations computing system 120 can determine a recovery plan to recover the vehicle 104. The recovery plan can include actions that attempt to alleviate the adverse condition associated with the vehicle 104, including one or more actions to attempt remote recovery of the vehicle 104 and/or one or more actions to perform on-site recovery of the vehicle 104. The operations computing system 120 can initiate the recovery plan to initiate remote recovery of the vehicle 104 and/or initiate on-site recovery of the vehicle 104. By way of example, if the adverse condition is associated with a navigation error of the vehicle 104, then the operations computing system 120 can initiate remote recovery of the vehicle 104 (e.g., send one or more control signals to cause the vehicle 104 to perform diagnostics maneuvers). By way of another example, if the adverse condition is associated with a component failure in the vehicle 104, then the operations computing system 120 can initiate on-site recovery of the vehicle 104 (e.g., send one or more control signals to cause the deployment of a recovery team).

At (312), the operations computing system 120 can initiate remote recovery of the vehicle 104. The operations computing system 120 can send data indicative of the recovery plan to the vehicle computing system 102, including one or more actions to be taken by the vehicle 104. The action(s) can include, for example, stopping a motion of the vehicle 104, rejecting any additional service requests, performing diagnostics maneuvers, providing information to a user, etc. The operations computing system 120 can receive updated adverse condition data 270 in response to the one or more actions taken by the vehicle 104, and determine whether the adverse condition persists. If the adverse condition persists, then the operations computing system 120 can initiate on-site recovery of the vehicle 104.

At (314), the vehicle computing system 102 can receive the data indicative of the recovery plan and store information associated with the recovery plan (e.g., one or more actions to be taken by the vehicle 104) in the recovery plan data 272. The vehicle computing system 102 can execute the one or more actions, and determine whether the adverse condition persists. The vehicle computing system 102 can store updated information associated with the adverse condition in the adverse condition data 270, and send the adverse condition data 270 to the operations computing system 120. By way of example, the operations computing system 120 (and/or a human operator associated therewith) can attempt to remotely operate the vehicle 104 to alleviate a navigation error associated with the vehicle 104.

At (316), the vehicle computing system 102 can determine that the adverse condition is alleviated, and determine that the vehicle 104 is in condition to provide a vehicle service to one or more users. The vehicle computing system 120 can resume providing a vehicle service to one or more current users, or control the vehicle 104 to be available for providing services to other users.

At (320), the operations computing system 120 can initiate on-site recovery of the vehicle 104. The operations computing system 120 can provide data indicative of the recovery plan to the recovery team computing system(s) 124. By way of example, the operations computing system 120 can provide data indicative of a selection of a recovery team to perform on-site recovery of the vehicle 104, an adverse condition associated with the vehicle 104, a location to send the selected recovery team, etc. In response, the recovery team computing system(s) 124 can notify and/or instruct the selected recovery team to perform the on-site recovery, or schedule the selected recovery team to be sent at the later time. In some implementations, the operations computing system 120 can send data indicative of the recovery plan to the vehicle computing system 102. By way of example, the vehicle computing system 102 can provide information indicative of the recovery plan to a user associated with the vehicle 104 based on the data received from the operations computing system 120.

At (322), the vehicle computing system 102 can receive the data indicative of the recovery plan and store information associated with the recovery plan (e.g., an estimated arrival time of a recovery team being set to the vehicle 104) in the recovery plan data 272. In some implementations, the vehicle computing system 102 can provide information indicative of the recovery plan to a user associated with the vehicle 104.

Figure 4:
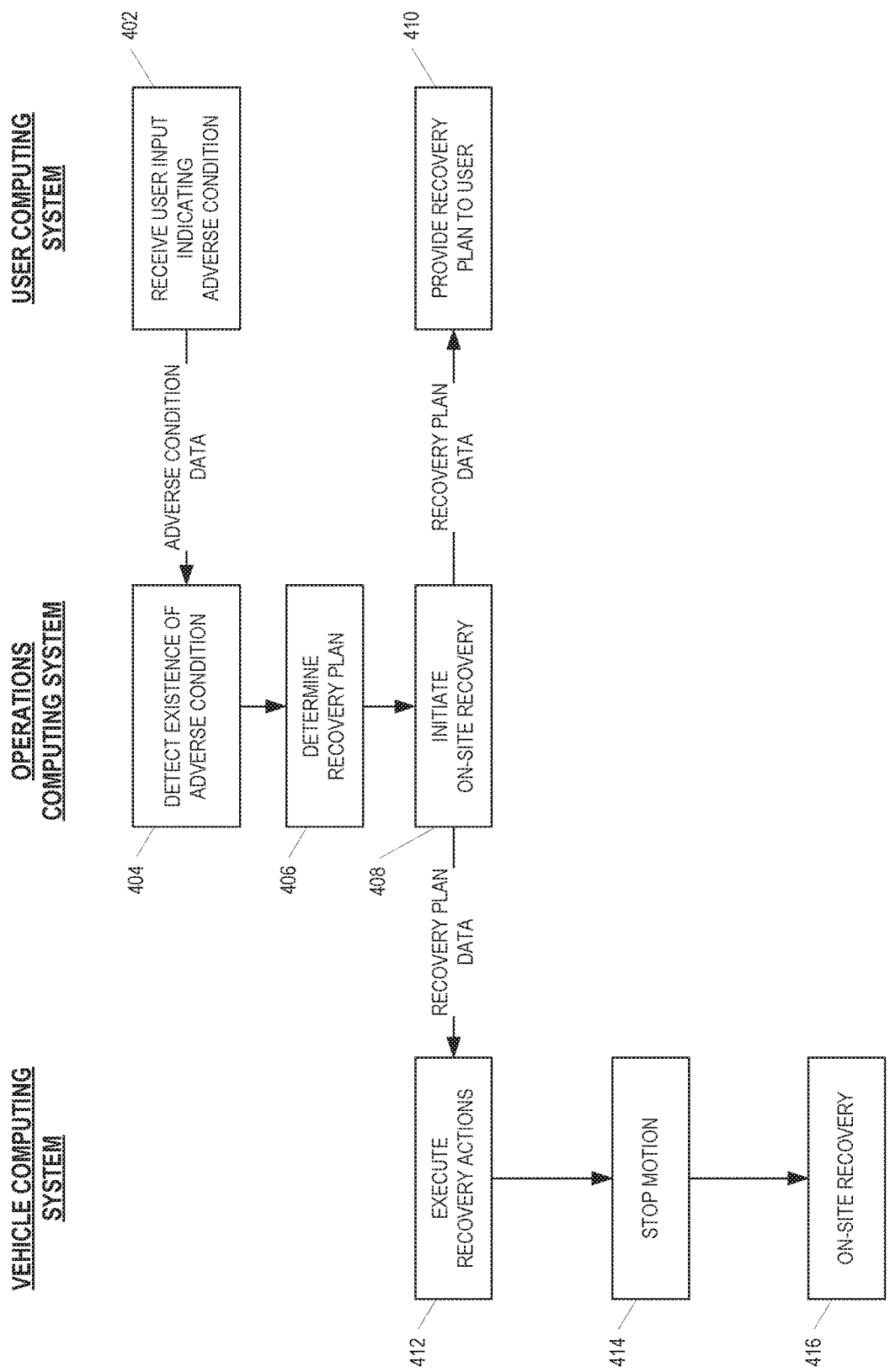
FIG. 4 depicts a flow diagram of recovering an autonomous vehicle according to example embodiments of the present disclosure.

FIG. 4 shows an example process of recovering vehicle 104 according to example embodiments of the present disclosure. One or more portion(s) of this process can be implemented by a computing system that includes one or more computing devices such as, for example, the vehicle computing system 102, the operations computing system 120, user computing system, etc. Each respective portion can be performed by any (or any combination) of a computing system. Moreover, one or more portion(s) can be implemented as an algorithm on the hardware components of the device(s) described herein (e.g., as in FIGS. 1 and 7), for example, to facilitate recovery of a vehicle.

At (402), the user 101 can provide user input to the user computing system 122 to indicate an existence of an adverse condition associated with the vehicle 104. The user computing system 122 can send data indicative of the adverse condition to the operations computing system 120 to report the adverse condition. By way of example, the user 101 can be associated with the vehicle 104 that is providing a vehicle service for the user 101 (e.g., position within the vehicle, about to board the vehicle, nearby the vehicle, etc.). The user 101 can experience a medical emergency and report the medical emergency to the operations computing system 120.

At (404), the operations computing system 120 can detect the existence of the adverse condition associated with the vehicle 104 based, at least in part, on the data indicative of the adverse condition received from the user computing system 122. By way of example, the operations computing system 120 can detect the existence of a medical emergency of the user 101 associated with the vehicle 104.

At (406), the operations computing system 120 can determine a recovery plan to recover the vehicle 104. The recovery plan can include actions that attempt to alleviate the adverse condition associated with the vehicle 104, including one or more actions to attempt remote recovery of the vehicle 104 and/or one or more actions to perform on-site recovery of the vehicle 104. The operations computing system 120 can initiate the recovery plan to attempt remote recovery of the vehicle 104 and/or initiate on-site recovery of the vehicle 104. By way of example, if the adverse condition is associated with a medical emergency of user 101, then the operations computing system 120 can initiate on-site recovery of the vehicle 104 (and the user 101).

At (408), the operations computing system 120 can initiate on-site recovery of the vehicle 104. The operations computing system 120 can select and send a recovery team to a location where the vehicle 104 is stopped, for example, by providing data indicative of the recovery plan to the recovery team computing system(s) 124. In some implementations, the operations computing system 120 can select and send a third-party service provider to the location where the vehicle 104 is stopped, for example, by providing data indicative of the recovery plan to the third-party computing system(s) 126. In some implementations, the operations computing system 120 can send data indicative of the recovery plan to the vehicle computing system 102 and the user computing system 122.

At (410), the user computing system 122 can receive the data indicative of the recovery plan, and provide information indicative of the recovery plan to the user 101. By way of example, the user computing system 122 can display an alert that medical assistance is being sent to the user 101 and an estimated arrival time. In some implementations, the operations computing system 120 can provide such data directly to the user computing system 122 (e.g., without the vehicle computing system 102 as an intermediary).

At (412), the vehicle computing system 102 can receive the data indicative of the recovery plan and store information associated with the recovery plan (e.g., one or more actions to be taken by the vehicle 104, an estimated arrival time of medical personnel being set to a location of the vehicle 104, etc.) in the recovery plan data 272. The vehicle computing system 102 can execute the one or more actions and/or provide information indicative of the recovery plan to the user 101. By way of example, the recovery plan data 272 can include instructions to stop a motion of the vehicle 104, preclude the vehicle 104 from providing a vehicle service, and wait for medical personnel to arrive at the vehicle 104 to assist the user 101.

At (414), the vehicle computing system 102 can stop a motion of the vehicle 104 (e.g., in response to executing one or more actions in the recovery plan). By way of example, the data indicative of the recovery plan received by the vehicle computing system 102 can include control signals to stop a motion of the vehicle 104. The vehicle computing system 102 can execute the control signals to stop the motion of the vehicle 104.

At (416), the vehicle computing system 102 can preclude the vehicle 104 from providing a vehicle service, and provide information indicative of the recovery plan to the user 101 (e.g., via human-machine interface system 118). By way of example, the data indicative of the recovery plan received by the vehicle computing system 102 can include control signals to reject any additional service requests, and control signals to display an estimated arrival time to the user 101. The vehicle computing system 102 can execute the control signals to preclude the vehicle 104 from providing a vehicle service, and display the estimated arrival time to the user 101 on a display device of the vehicle 104.

FIGS. 5A-5D show diagrams that illustrate examples of selecting a recovery team to assist in recovering an autonomous vehicle according to example embodiments of the present disclosure.

Figure 5A:
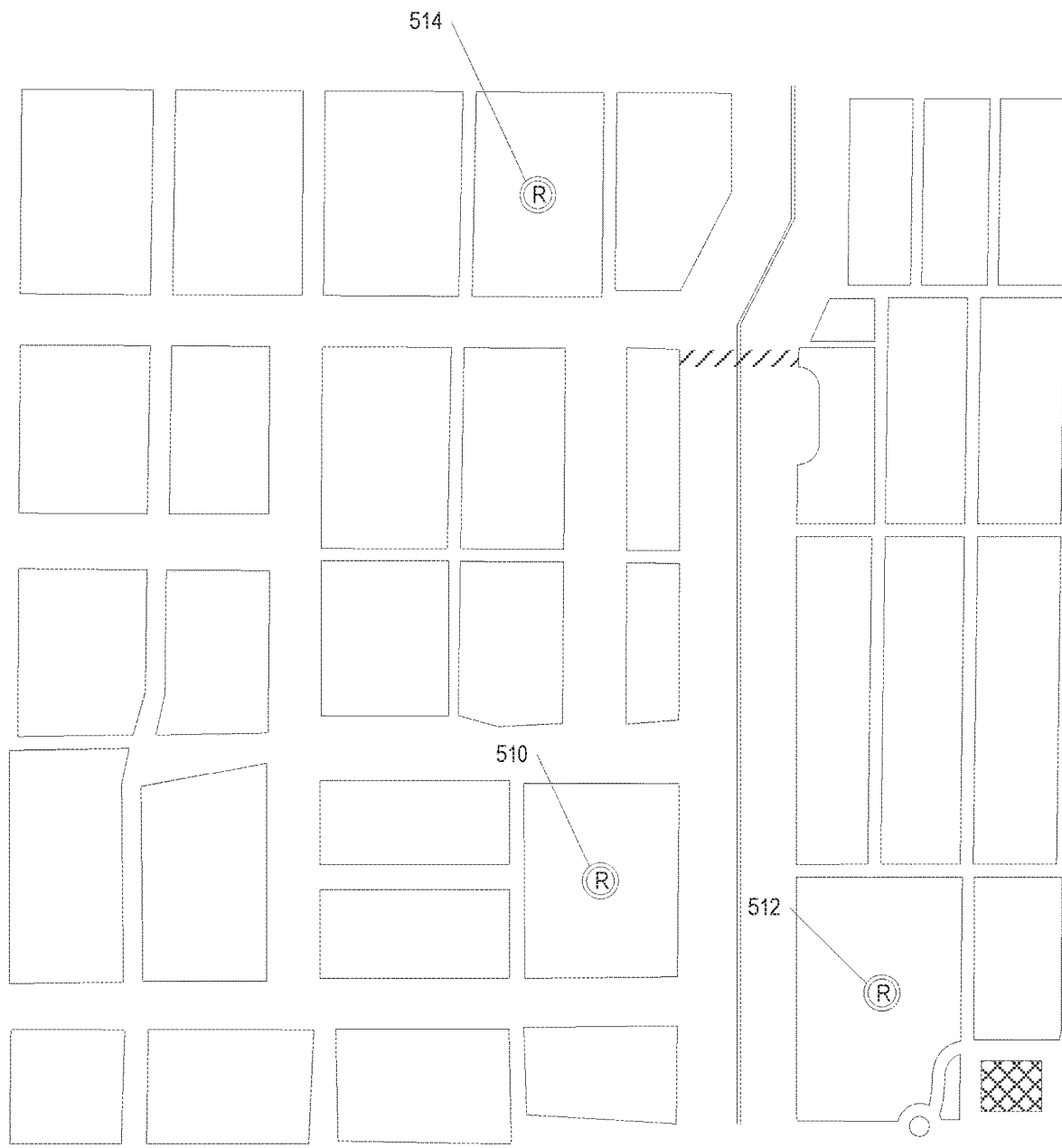
FIGS. 5A-5D depict diagrams that illustrate a selection of a recovery team to recover an autonomous vehicle according to example embodiments of the present disclosure.

As shown in FIG. 5A, the operations computing system 120 can manage a plurality of recovery teams 510, 512, 514 that can be sent to recover one or more vehicles in the fleet of vehicles, such as vehicle 104. The recovery teams 510, 512, 514 can include for example, one or more human operators (e.g., drivers, mechanics, etc.), one or more vehicles (e.g., autonomous vehicles), and/or other personnel or equipment that can assist in recovering a vehicle. The operations computing system 120 can determine strategic locations where the recovery teams 510, 512, 514 are located. The operations computing system 120 can determine the strategic locations based on, for example, vehicle service demand, a supply of vehicles, an incident history, characteristics of the fleet, weather/road/traffic conditions, etc.

Figure 5B:

As shown in FIG. 5B, the operations computing system 120 can update the strategic locations for the recovery teams 510, 512, 514, for example, based on a change in vehicle service demand, a supply of vehicles, an incident history, characteristics of the fleet, weather/road/traffic conditions, etc. For instance, the operations computing system 120 can update a strategic location of recovery team 510 from the location shown in FIG. 5A to the location shown in FIG. 5B in the event that more vehicles associated with the operations computing system 120 (e.g., in a vehicle fleet) are nearby the location of recovery team 510 in FIG. 5B.

Figure 5C:
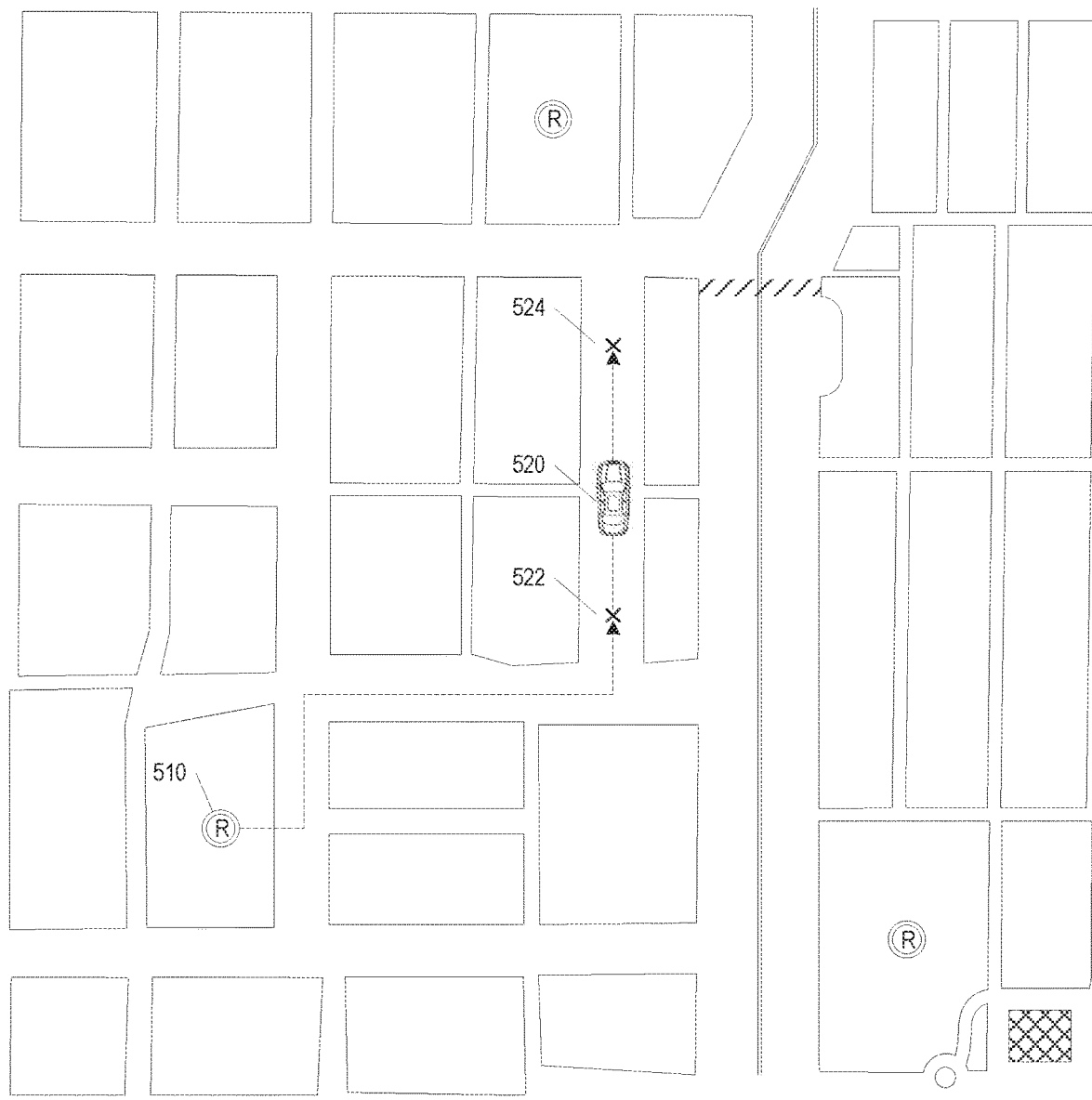

As shown in FIG. 5C, the recovery teams 510, 512, 514 can be mobile and can change locations (e.g., in response to an existence of one or more adverse conditions associated with one or more vehicles in the fleet). For instance, the vehicle 520 can be associated with the recovery team 510. The operations computing system 120 can select the recovery team 510 to assist in recovering a first vehicle at a location 522, as part of a recovery plan. The operations computing system 120 can provide data indicative of the recovery plan to the recovery team computing system(s) 124. In response, the recovery team computing system(s) 124 can notify and/or instruct the recovery team 510 to assist in recovering the first vehicle at the location 522. The recovery team 510 can send the vehicle 520 from an initial location to the location 522 where recovery team 510 can assist in recovering the first vehicle. When the vehicle 520 arrives at the location 522, the operations computing system 120 can change a location associated with the recovery team 510 to the location 522. The operations computing system 120 can select the recovery team 510 to assist in recovering a second vehicle at a location 524, because location 522 is geographically proximate to the location 524. The operations computing system 120 can send the vehicle 520 from the location 522 to the location 524 where recovery team 510 can assist in recovering the second vehicle. When the vehicle 520 arrives at the location 524, the operations computing system 120 can change a location associated with the recovery team 510 to the location 524.

Figure 5D:
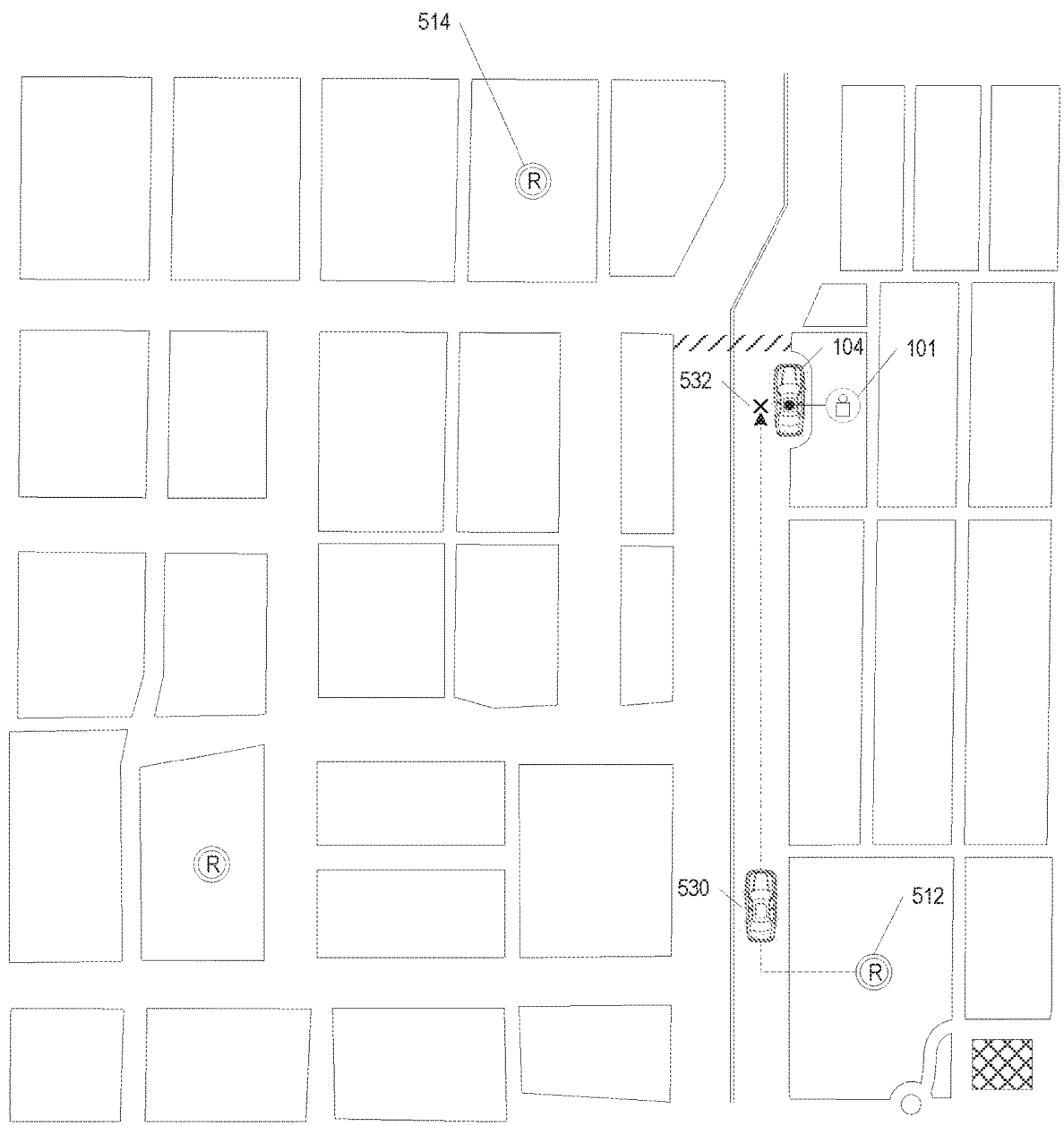

As shown in FIG. 5D, the operations computing system 120 can select a recovery team to assist in recovering a vehicle based on an available recovery team that is geographically proximate to the vehicle, or that can arrive at a location of the vehicle in the shortest time. For instance, the operations computing system 120 can select a recovery team to assist in recovering the vehicle 104. The operations computing system 120 can determine that recovery team 514 is nearer to vehicle 104 than recovery team 512, but that recovery team 512 can arrive at the vehicle 104 in the shortest time (e.g., due to traffic, etc.), and therefore select the recovery team 512 to assist in recovering the vehicle 104, as part of a recovery plan. The operations computing system 120 can provide data indicative of the recovery plan to the recovery team computing system(s) 124. In response, the recovery team computing system(s) 124 can notify and/or instruct the recovery team 512 to assist in recovering the vehicle 104 at the location 522. The recovery team 512 can send vehicle 530 to the vehicle 104 to assist in recovering the vehicle 104.

Figure 6:
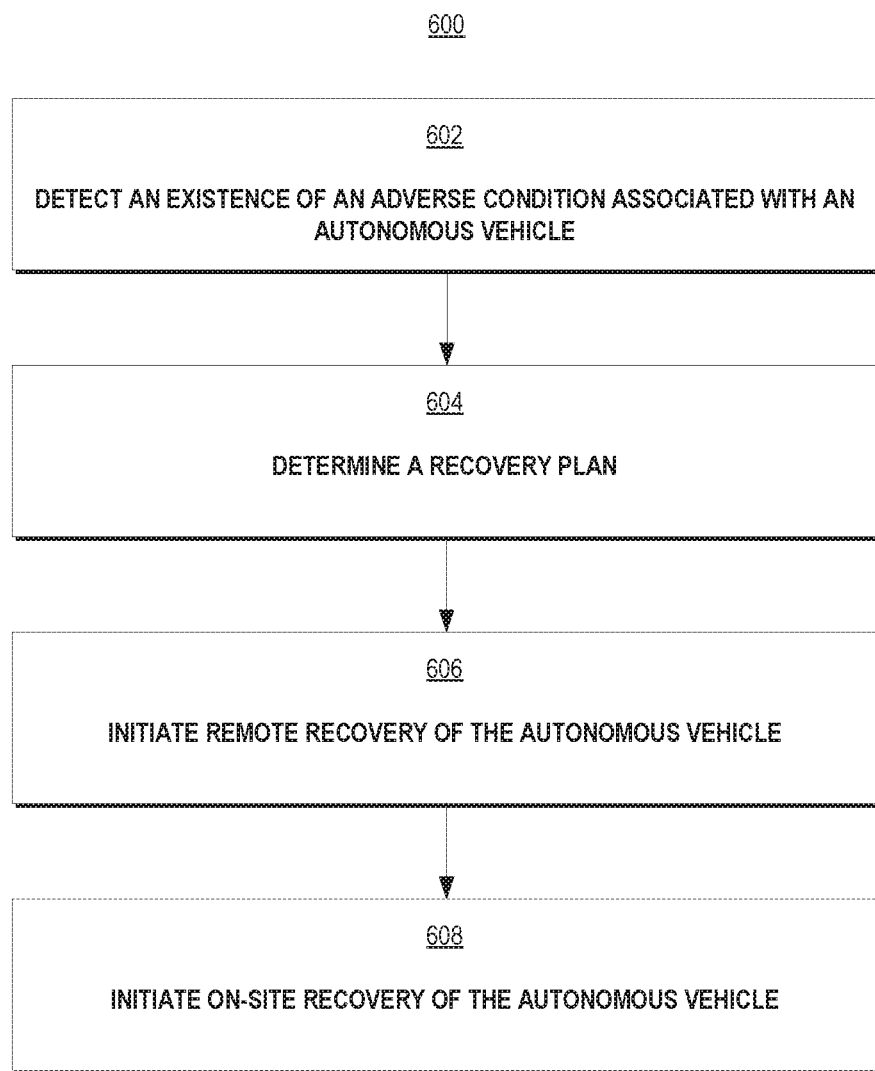
FIG. 6 depicts a flow diagram of recovering an autonomous vehicle according to example embodiments of the present disclosure.

FIG. 6 depicts a flow diagram of example method 600 according to example embodiments of the present disclosure. One or more portion(s) of the method 600 can be implemented as operations by one or more computing system(s) such as, for example, the computing system(s) 102, 120, 701, and 710 shown in FIGS. 1 and 7. Moreover, one or more portion(s) of the method 600 can be implemented as an algorithm on the hardware components of the system(s) described herein (e.g., as in FIGS. 1, 2, and 7) to, for example, recover an autonomous vehicle. FIG. 6 depicts elements performed in a particular order for purposes of illustration and discussion. Those of ordinary skill in the art, using the disclosures provided herein, will understand that the elements of any of the methods (e.g., of FIG. 6) discussed herein can be adapted, rearranged, expanded, omitted, combined, and/or modified in various ways without deviating from the scope of the present disclosure.

FIG. 6 depicts a diagram of a method 600 for recovering an autonomous vehicle. At (602), the method 600 can include detecting an existence of an adverse condition associated with an autonomous vehicle. For example, the operations computing system 120 can detect an existence of an adverse condition associated with the vehicle 104. The adverse condition can be associated with at least one of a component failure in the vehicle 104, an environment proximate to the vehicle 104, or the user 101 associated with the vehicle 104. The operations computing system 120 can receive data indicative of the adverse condition from the vehicle computing system 102, or a user computing system 122 corresponding to the user 101.

At (604), the method 600 can include determining a recovery plan. For example, the operations computing system 120, in response to detecting the adverse condition associated with the vehicle 104, can determine a recovery plan for the vehicle 104 based at least in part on one or more attributes associated with the adverse condition. The one or more attributes can include at least one of a characteristic of at least a portion of a surrounding environment of the vehicle 104, a vehicle service associated with the vehicle 104, or the user 101 associated with the vehicle 104. The recovery plan can include one or more recovery actions to recover the vehicle 104 at a remote location, such as, for example, sending a recovery team. The operations computing system 120 can obtain data associated with one or more recovery teams, including a location of the one or more recovery teams, and determine the recovery plan based at least in part on the remote location and the location of the one or more recovery teams.

At (606), the method 600 can include initiating remote recovery of the autonomous vehicle. For example, the operations computing system 120 can initiate the recovery plan to attempt remote recovery of the vehicle 104 at the remote location. The operations computing system 120 can send one or more control signals to the vehicle 104 that include one or more vehicle maneuvers to be executed by the vehicle 104. The operations computing system 120 can also send one or more control signals to the vehicle 104 that include providing data indicative of the adverse condition and the recovery plan for display via one or more display devices onboard the vehicle 104.

Additionally, or alternatively, at (608), the method 600 can include initiating on-site recovery of the autonomous vehicle. For example, the operations computing system 120 can initiate the recovery plan to initiate on-site recovery of the vehicle 104 at the remote location. The operations computing system 120 can send one or more control signals to the vehicle 104 that include one or more vehicle maneuvers to be executed by the vehicle 104. The operations computing system 120 can also send one or more control signals to the vehicle 104 that include providing data indicative of the adverse condition and the recovery plan for display via one or more display devices onboard the vehicle 104. The operations computing system 120 can select a recovery team to perform on-site recovery of the vehicle 104 as part of the recovery plan, based at least in part on the one or more attributes associated with the adverse condition, and provide data indicative of the recovery plan to the recovery team computing system(s) 124 to send the recovery team to the remote location to recover the vehicle 104. The recovery team can include another autonomous vehicle to transport the recovery team to the remote location.

Figure 7:
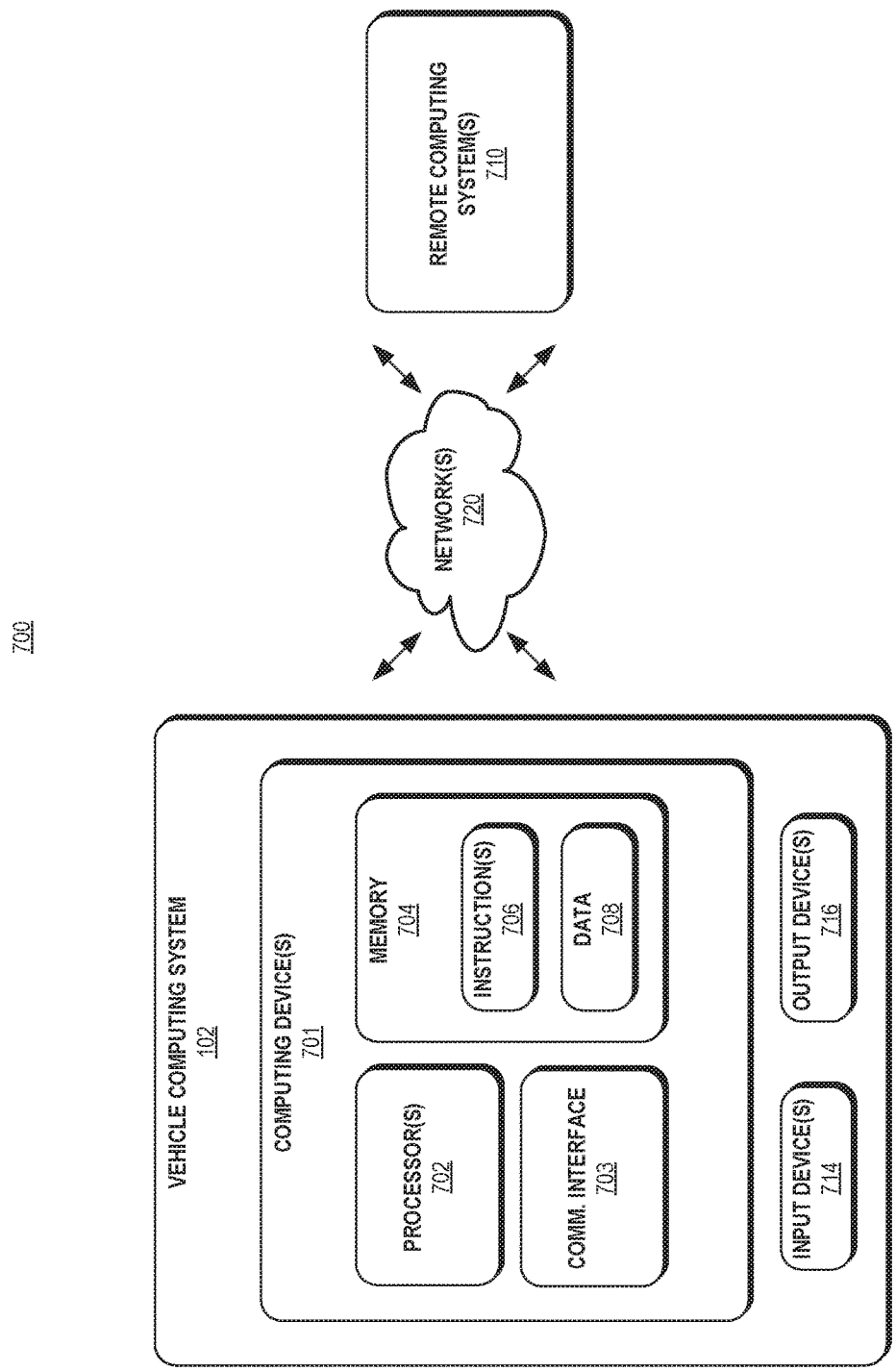
FIG. 7 depicts a block diagram of example system components according to example embodiments of the present disclosure.

FIG. 7 depicts an example computing system 700 according to example embodiments of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include the vehicle computing system 102 of the vehicle 104 and, in some implementations, remote computing system(s) 710 including one or more remote computing system(s) that are remote from the vehicle 104 (e.g., operations computing system 120, user computing system 122, recovery team computing system(s) 124, third-party computing system(s) 126) that can be communicatively coupled to one another over one or more networks 720. The remote computing system 710 can be associated with a central operations system and/or an entity associated with the vehicle 104 such as, for example, a vehicle owner, vehicle manager, fleet operator, service provider, etc.

The computing device(s) 701 of the vehicle computing system 102 can include processor(s) 702 and a memory 704. The one or more processors 702 can be any suitable processing device (e.g., a processor core, a microprocessor, an ASIC, a FPGA, a controller, a microcontroller, etc.) and can be one processor or a plurality of processors that are operatively connected. The memory 704 can include one or more non-transitory computer-readable storage media, such as RAM, ROM, EEPROM, EPROM, one or more memory devices, flash memory devices, etc., and combinations thereof.

The memory 704 can store information that can be accessed by the one or more processors 702. For instance, the memory 704 (e.g., one or more non-transitory computer-readable storage mediums, memory devices) on-board the vehicle 104 can include computer-readable instructions 706 that can be executed by the one or more processors 702. The instructions 706 can be software written in any suitable programming language or can be implemented in hardware. Additionally, or alternatively, the instructions 706 can be executed in logically and/or virtually separate threads on processor(s) 702.

For example, the memory 704 on-board the vehicle 104 can store instructions 706 that when executed by the one or more processors 702 on-board the vehicle 104 cause the one or more processors 702 (the vehicle computing system 102) to perform operations such as any of the operations and functions of the vehicle computing system 102, as described herein, one or more operations of method 600, and/or any other operations and functions of the vehicle computing system 102, as described herein.

The memory 704 can store data 708 that can be obtained, received, accessed, written, manipulated, created, and/or stored. The data 708 can include, for instance, data associated with perception, prediction, motion plan, maps, vehicle diagnostics, vehicle state information, vehicle assignment information, and/or other data/information as described herein. In some implementations, the computing device(s) 701 can obtain data from one or more memory device(s) that are remote from the vehicle 104.

The computing device(s) 701 can also include a communication interface 703 used to communicate with one or more other system(s) on-board the vehicle 104 and/or a remote computing device that is remote from the vehicle 104 (e.g., of remote computing system(s) 710). The communication interface 703 can include any circuits, components, software, etc. for communicating via one or more networks (e.g., 720). In some implementations, the communication interface 703 can include, for example, one or more of a communications controller, receiver, transceiver, transmitter, port, conductors, software, and/or hardware for communicating data.

The vehicle computing system 102 can also include one or more input device(s) 714 and/or one or more output device(s) 716. The input device(s) 714 and/or the output device(s) 716 can be included and/or otherwise associated with a human-machine interface system. The input devices 714 can include, for example, hardware for receiving information from a user, such as a touch screen, touch pad, mouse, data entry keys, speakers, a microphone suitable for voice recognition, etc. The output device(s) 716 can include one or more display device(s) (e.g., display screen, CRT, LCD) and/or one or more audio output device(s) (e.g., speakers). The display device(s) and/or the audio output device(s) can be used to facilitate communication with a user. For example, a human operator (e.g., associated with a service provider) can communicate with a current user of the vehicle 104 via at least one of the display device(s) and the audio output device(s).

The network(s) 720 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 720 can be accomplished, for instance, via a communication interface using any type of protocol, protection scheme, encoding, format, packaging, etc.

The remote computing system 710 can include one or more remote computing devices that are remote from the vehicle computing system 102. The remote computing devices can include components (e.g., processor(s), memory, instructions, data) similar to that described herein for the computing device(s) 701. Moreover, the remote computing system(s) 710 can be configured to perform one or more operations of the operations computing system 120, user computing system 122, recovery team computing system(s) 124, and/or third-party computing system(s) 126, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for autonomous vehicle recovery, the method comprising:
    obtaining, by a computing system that includes one or more computing devices, data indicative of a status of each of a plurality of autonomous vehicles based on sensor data from one or more sensors onboard each of the plurality of autonomous vehicles;
    determining, by the computing system and based on the status of each of the plurality of autonomous vehicles, a first autonomous vehicle from the plurality of autonomous vehicles to travel to a first location to perform a task, wherein the first location is selected from a set of locations based at least in part on one or more conditions associated with the first autonomous vehicle;
    detecting, by the computing system, an existence of an adverse condition associated with the first autonomous vehicle;
    determining, by the computing system, in response to detecting the adverse condition, a second autonomous vehicle from the plurality of autonomous vehicles based at least in part on a second location associated with the adverse condition and the first location; and
    transmitting, by the computing system, one or more control signals to the second autonomous vehicle to travel to the second location to continue performing the task.

2. The computer-implemented method of claim 1, further comprising:
    transmitting, by the computing system, one or more control signals to the plurality of autonomous vehicles to travel to a plurality of strategic locations based on the status of each of the plurality of autonomous vehicles, wherein the plurality of strategic locations are selected from a set of locations based at least in part on one or more conditions associated with the plurality of autonomous vehicle.

3. The computer-implemented method of claim 2, further comprising:
    updating, by the computing system, the plurality of strategic locations for the plurality of autonomous vehicles based on a change in the one or more conditions associated with the plurality of autonomous vehicles.

4. The computer-implemented method of claim 1, wherein the second autonomous vehicle is determined to perform on-site recovery of the first autonomous vehicle based at least in part on one or more attributes associated with the adverse condition.

5. The computer-implemented method of claim 1, wherein transmitting, by the computing system, the one or more control signals to the second autonomous vehicle to travel to the second location to continue performing the task comprises:
    controlling, by the computing system, the second autonomous vehicle to transport one or more members of a recovery team to the second location; and
    controlling, by the computing system, the second autonomous vehicle to drop-off the one or more members of the recovery team at the second location.

6. The computer-implemented method of claim 1, wherein the adverse condition is associated with at least one of a component failure in the first autonomous vehicle, an environment proximate to the first autonomous vehicle, or a user associated with the first autonomous vehicle.

7. The computer-implemented method of claim 1, wherein detecting the existence of the adverse condition comprises:
    receiving, by the computing system, data indicative of the adverse condition from the first autonomous vehicle or a user device corresponding to a user associated with the first autonomous vehicle.

8. The computer-implemented method of claim 1, wherein determining, by the computing system, in response to detecting the adverse condition, the second autonomous vehicle from the plurality of autonomous vehicles based at least in part on the second location associated with the adverse condition and the first location comprises:

obtaining, by the computing system, data associated with a plurality of strategic locations for the plurality of autonomous vehicles, the plurality of strategic locations including locations where the plurality of autonomous vehicles are positioned prior to deployment for performing a task; and determining, by the computing system, the second autonomous vehicle from the plurality of autonomous vehicles based at least in part on a geographic proximity or a temporal proximity of the location of the second autonomous vehicle with respect to the second location.

9. The computer-implemented method of claim 1, further comprising:
updating, by the computing system, one or more conditions associated with the first autonomous vehicle and the second autonomous vehicle.

10. The computer-implemented method of claim 1, further comprising:
updating, by the computing system, a plurality of strategic locations from a set of strategic locations based at least in part on the change in the one or more conditions associated with the first autonomous vehicle and the second autonomous vehicle.

11. The computer-implemented method of claim 1, further comprising:
sending, by the computing system, in response to detecting the adverse condition, one or more control signals to the first autonomous vehicle, the control signals comprising one or more vehicle maneuvers to be executed by the first autonomous vehicle.

12. The computer-implemented method of claim 1, further comprising:
providing, by the computing system, in response to detecting the adverse condition, data indicative of the adverse condition and a recovery plan for display via one or more display devices onboard the first autonomous vehicle.

13. A computing system for autonomous vehicle recovery, the system comprising:
one or more processors; and
one or more tangible, non-transitory, computer readable media that collectively store instructions that when executed by the one or more processors cause the computing system to perform operations, the operations comprising:
obtaining data indicative of a status of each of a plurality of autonomous vehicles based on sensor data from one or more sensors onboard each of the plurality of autonomous vehicles;
determining, from the plurality of autonomous vehicles and based on the status of each of the plurality of autonomous vehicles, a first autonomous vehicle to travel to a first location to perform a task, wherein the first location is selected from a set of locations based at least in part on one or more conditions associated with the first autonomous vehicle;
detecting an existence of an adverse condition associated with the first autonomous vehicle;
determining, in response to detecting the adverse condition, a second autonomous vehicle from the plurality of autonomous vehicles based at least in part on a second location associated with the adverse condition and the first location; and
transmitting one or more control signals to the second autonomous vehicle to travel to the second location to continue performing the task.

14. The computing system of claim 13, wherein the second autonomous vehicle is determined to perform on-site recovery of the first autonomous vehicle based at least in part on one or more attributes associated with the adverse condition.

15. The computing system of claim 14, wherein transmitting one or more second control signals to the second autonomous vehicle to travel to the second location to continue performing the task comprises:
controlling the second autonomous vehicle to transport one or more members of a recovery team to the second location; and
controlling the second autonomous vehicle to drop-off the one or more members of the recovery team at the second location.

16. The computing system of claim 13, wherein determining, in response to detecting the adverse condition, the second autonomous vehicle from the plurality of autonomous vehicles based at least in part on the second location associated with the adverse condition and the first location comprises:
obtaining, by the computing system, data associated with a set of strategic locations comprising locations where the plurality of autonomous vehicles are positioned prior to deployment for performing a task; and
determining, by the computing system, the second autonomous vehicle from the plurality of autonomous vehicles based at least in part on a geographic proximity or a temporal proximity of the location of the second autonomous vehicle with respect to the second location.

17. The computer-implemented method of claim 13, further comprising:
updating, by the computing system, one or more conditions associated with the first autonomous vehicle and the second autonomous vehicle.

18. The computer-implemented method of claim 13, further comprising:
updating, by the computing system, a plurality of strategic locations from a set of strategic locations based at least in part on the change in the one or more conditions associated with the one or more autonomous vehicles.

19. An autonomous vehicle in a fleet of autonomous vehicles comprising:
one or more processors; and
one or more tangible, non-transitory, computer readable media that collectively store instructions that when executed by the one or more processors cause the one or more processors to perform operations, the operations comprising:
monitoring, via one or more sensors onboard the autonomous vehicle, one or more parameters associated with a first autonomous vehicle while the first autonomous vehicle is performing a task at a first location;
detecting an adverse condition associated with the first autonomous vehicle based at least in part on the one or more parameters;
stopping a motion of the first autonomous vehicle in response to detecting the adverse condition;
sending one or more communications to a remote computing system, the one or more communications including a request for assistance with the adverse condition;
receiving, from the remote computing system, data indicative of a second autonomous vehicle that is to continue performing the task, wherein the second autonomous vehicle is determined based at least in part on a second location associated with the adverse condition and the first location; and displaying data indicative of the adverse condition and a recovery plan based on the data indicative of the second autonomous vehicle via one or more display devices onboard the autonomous vehicle.

20. The autonomous vehicle of claim 19, further comprising:

receiving, from the remote computing system, one or more control signals comprising one or more vehicle maneuvers to be executed by the first autonomous vehicle;

executing the one or more vehicle maneuvers;

determining an existence of the adverse condition after executing the one or more vehicle maneuvers; and sending data indicative of the determination to the remote computing system.

* * * * *